United States Patent [19]
Ohkawa et al.

[11] Patent Number: 5,468,358
[45] Date of Patent: Nov. 21, 1995

[54] FABRICATION OF FIBER-REINFORCED COMPOSITES

[75] Inventors: Tihiro Ohkawa, La Jolla; Frederick H. Elsner, Carlsbad, both of Calif.

[73] Assignee: General Atomics, San Diego, Calif.

[21] Appl. No.: 88,075

[22] Filed: Jul. 6, 1993

[51] Int. Cl.$^6$ ................................................. C25D 13/02
[52] U.S. Cl. .................................... 204/181.5; 204/180.2
[58] Field of Search ............................... 204/180.2, 181.5

[56] References Cited

U.S. PATENT DOCUMENTS

| | | | |
|---|---|---|---|
| 3,498,890 | 3/1970 | Divecha et al. | 204/3 |
| 3,505,177 | 4/1970 | Chester et al. | 204/9 |
| 3,716,461 | 2/1973 | Ahmad | 204/16 |
| 4,264,422 | 4/1981 | Funabashi et al. | 204/181 F |
| 4,659,444 | 4/1987 | Iwata et al. | 204/181.4 |
| 4,975,417 | 12/1990 | Koura | 204/181.5 |
| 5,041,199 | 8/1991 | Di Franco | 204/181.5 |
| 5,073,240 | 12/1991 | Raggio et al. | 204/181.5 |
| 5,196,098 | 3/1993 | Rodriguez et al. | 204/180.2 |
| 5,254,397 | 10/1993 | Kawai et al. | 428/425 |
| 5,302,265 | 4/1994 | Dalzell et al. | 204/181.5 |

FOREIGN PATENT DOCUMENTS

| | | | |
|---|---|---|---|
| 221527 | 12/1957 | Australia | 204/180.2 |
| 0203759 | 3/1986 | European Pat. Off. | |
| 3716118 | 5/1987 | Germany . | |
| 1155960 | 8/1969 | United Kingdom . | |
| 1224166 | 3/1971 | United Kingdom . | |

OTHER PUBLICATIONS

Mizuguchi, et al., "A Highly Stable Nonaqueous Suspension for the Electophoretic Deposition of Powdered Substances" (Sep. 1983), *J. Electrochem. Soc.*, vol. 130, No. 9, pp. 1819–1825.

L. Gal-Or, et al., "Deep Electrophoretic Penetration and Deposition of Ceramic Particles Inside Porous Substrates" (Apr. 1992), *J. Electrochem. Soc.*, vol. 139, No. 4, pp. 1078–1081.

Browning, et al., "Deposition Forming Processes for Aerospace Structures" (Jan. 1964), Technical Documentary Report No. ML TDR 64–26, *Air Force Materials Laboratory*.

Sarkar, et al., "Structural Ceramic Microlaminates by Electrophoretic Deposition" (1992), *Communications of the American Ceramic Society*, vol. 75, No. 10, pp. 2907–2909.

Gutierrez, et al., "Electrophoretic Deposition: A Versatile Coating Method" (Oct. 1962), *Journal of the Electrochemical Society*, vol. 109, No. 10, pp. 923–927.

*Primary Examiner*—John Niebling
*Assistant Examiner*—Kishor Mayekar
*Attorney, Agent, or Firm*—Fitch, Even, Tabin & Flannery

[57] ABSTRACT

Methods for making fiber-reinforced carbon, ceramic or metal matrix composites using electrophoretic infiltration of an array or preform of electrically insulating fibers positioned adjacent a target electrode in an appropriate liquid slurry. The slurry contains a dispersion of micron- or submicron-sized particles, usually of elemental or ceramic materials, which are suitably electrically charged in the slurry, employing a surfactant if necessary. Application of an appropriate voltage causes charged particles to migrate toward the target electrode following a path that causes them to infiltrate the interstices of the fiber array which is usually formed of woven or aligned tows of minute fibers about 5 to 15 microns in diameter. The particles initially deposit on the electrode with subsequent particles aggregating on top of those particles, the process continuing to form a growth front of deposited material growing away from the electrode surface. The resultant deposit of aggregating particles grows through the interstices of the fibrous preform from one surface of the preform to the other, filling voids with matrix material. Following such infiltration, the impregnated particles are consolidated by hot-pressing and/or by subjection to CVI.

20 Claims, No Drawings

FABRICATION OF FIBER-REINFORCED COMPOSITES

This invention relates to fiber-reinforced composite materials, and more particularly, to improved methods for making such materials having carbon, ceramic or metal matrices which economically achieve relatively high densities.

BACKGROUND OF THE INVENTION

Ceramic fiber-ceramic matrix composites offer unequaled high-temperature performance and stability in oxidizing environments; however, the fabrication of strong, tough composites is a difficult task and often an expensive one. Generally, the fiber-reinforcement of otherwise brittle ceramic materials offers significant opportunities to toughen the brittle matrix; therefore, fiber preforms are used as starting material for incorporation within a surrounding ceramic matrix. The same also generally applies to carbon and metal matrices.

A number of techniques have been developed for incorporating a carbon, a metal or a ceramic matrix into a fiber preform, which techniques include filament-winding through a slurry of the matrix material, chemical vapor deposition or infiltration (CVD or CVI), and sol-gel infiltration. In passing filament material through a slurry of the matrix material prior to winding, only a relatively small amount of the matrix material adheres to the filaments. CVI or CVD is a notoriously slow process, often being measured in days, and it is expensive for such reason and because it traditionally requires special molds or supporting structures. More conventional ceramic processing techniques, such as slip casting and/or vacuum casting, followed by hot-pressing have not provided adequate penetration of the matrix material, particularly crystalline matrix material having a relatively high melting point, within the interstices of preforms made with reinforcing fibers, thereby leaving undesirably large amounts of void volume in the resultant product. Fiber-metal composites have been made by electrodepositing a metal matrix onto a cathode from an agitated bath containing whiskers of $Al_2O_3$ or SiC fibers which become embedded therewithin, as shown in U.S. Pat. No. 3,498,890; however, there are limits to composite strengths that are obtained using such a process. An improvement of such a process using centrifugal force is shown in U.S. Pat. No. 3,716,461, but this process is complicated and still limited to the use of short fibers.

Certain matrix materials can be advantageously supplied by organic precursors, and resinous materials, such as synthetic organic polymers either in the form of fine particles or liquid resins, have more recently been employed for this purpose. However, liquid-phase impregnation utilizing either thermosetting resins or pitch-based coal tars, which are then pyrolyzed to form silicon carbide, silicon nitride, carbon or the like to provide matrix material, have relatively low solids yields following pyrolysis; thus, such liquid impregnations necessitate at least about 3 processing cycles to achieve composite densities of greater than 80%. Accordingly, manufacturing is complicated and relatively expensive because of the repetitive impregnation and pyrolysis cycles that are required.

As a result, more efficient methods continue to be sought for making relatively dense, fiber-reinforced carbon, ceramic and metal matrix composite materials.

SUMMARY OF THE INVENTION

It has now been found that electrophoretic deposition can be advantageously employed to uniformly impregnate an array or preform of electrically insulating fibers with micron- or submicron-sized particles of carbon, metal or ceramic substances or precursors thereof, which, following an appropriate consolidation step, subsequently provide dense matrix material in surrounding relationship to such continuous fiber-reinforcement. As a result, more efficient methods for making composite materials of superior quality are provided. Such consolidation can be carried out by hot-pressing and/or by CVI or the like, employing an appropriate vaporous substance compatible with the impregnated particles to cross-link or lock them in position and thereby create composite materials of low overall porosity and high strength.

DETAILED DESCRIPTION OF PREFERRED EMBODIMENTS

Electrophoretic deposition generally involves the mechanism of electrophoresis which constitutes the motion of charged particles in a liquid medium under the influence of an applied electrical field. Generally, an article being coated is placed in an electrodeposition bath and connected as either the anode or the cathode. A voltage is then applied between the two electrodes so that the current passes from anode to cathode, producing an electric current and causing a coating to be deposited. With respect to the present invention, a first or target electrode having a surface of desired shape, similar in shape to that of the composite material being produced, is located within the electrode bath. This first electrode, which is preferably made the anode, may be flat. It may have a single exposed surface, or both flat surfaces of a plate-like electrode could be used. Alternatively, the electrode could be of any desired shape, such as tubular, cylindrical, conical, undulating, etc., depending upon what shape of composite material is desired. The resistivity to current flow of the fibrous array to be infiltrated should be greater than the resistivity of the slurry, and a suitable voltage is employed to cause migration of the slurry particles to effectively occur. Generally a voltage of between about 10 volts and 1000 volts is used, and commonly a voltage in the range of about 240 to 320 volts is employed for slurries of present greatest concern.

The fibrous array which is used can be of any suitable character, such as woven fiber cloth arrangements, 3-dimensional woven structures, e.g. cubic, parallel fiber lay-ups, or even random fiber arrangements, such as are found in air-laid or water-laid materials; the latter are acceptable so long as the fiber array has sufficient wet-strength to retain its integrity in a liquid environment wherein the electrophoretic deposition will take place. Generally, fibers which are used are in the form of continuous fibrous tows constituting bundles of about 2,000 to about 3,000 fibers or microfilaments per tow, with the individual fibers, usually having a diameter of about 10 μm or less. As employed herein, the term "continuous" refers to fibers or filaments having a substantial length such that they might be woven into a fabric or like 2-dimensional or 3-dimensional structure, if desired. Generally the fibers that are used are at least about 10 cm. in length and between about 5 and about 15 microns in diameter. However, larger fibers can be used, e.g. up to about 150 to 200 microns in diameter if desired for particular purposes.

The fibers employed are preferably fibers that are commercially available, for example, Nextel $Al_2O_3$-$SiO_2$ fibers about 10 microns in diameter, or silicon carbide fibers about 5 to 15 microns in diameter, examples of which include those sold under the trademarks "Nicalon" and "HPZ".

However, a wide variety of continuous multifilament refractory fiber tows can be employed in the practice of the present invention. Examples of such fibers include those formed from silicon dioxide ($SiO_2$), aluminum silicates, such as mullite, aluminum oxide ($Al_2O_3$), titanium oxide ($TiO_2$), zirconium silicate, silicon carbide (SIC), silicon nitride and boron nitride (BN), as well as from other high temperature oxides, nitrides, carbides, silicates and the like known in the art of refractory fibers as useful in making composites. Generally, silicon carbide, carbon, and silicon nitride fibers are preferred. Tows made from SiC are commercially available from Nippon Carbon Co. of Tokyo, Japan, under the trademark Nicalon, and tows made from silicon nitride are sold under the trademark HPZ. Carbon fibers are available from a number of sources, such as Hercules, Ashland, BASF, and Amoco. Similar tows of alumina-silica (often termed aluminum silicate) blends, such as mullite, are commercially available under the trademark "Nextel", and these fibers can also be obtained having small percentages of various additives, such as boria ($B_2O_3$). Nearly all of these fibers can also be obtained in woven form.

For the electrophoretic deposition process to work effectively, it is important that the fiber array be electrically insulating; as a result, the particles being attracted to the electrode will be drawn through the interstices of the fiber array so as to build up in the region adjacent the electrode occupied by the array in juxtaposition with this electrode. As a result, the migrating particles aggregate against the surface of the electrode and gradually fill the interstices of the fiber array, starting at the electrode surface and growing as a front through the body of the fiber array. Preferably, the fibers themselves are made of electrically nonconducting or insulating material, such as silicon carbide, silicon nitride, ceramic oxide (e.g. mullite or alumina) or the like; however, if the desired fibers for the composite are electrically conductive, such as pure carbon fibers, suitable compensation is made. For example, individual carbon fibers may be coated with a suitable electrically insulating material, for example, by vapor-depositing or electrodepositing boron nitride or the like onto the carbon fibers, so long as the added insulating material is compatible with the ultimate purpose of the composite material.

Preferably however, for carbon fiber composites, fibers of carbon precursor materials are employed, such as those which are commercially available from Amoco. These are incompletely carbonized, organic precursors of carbon fibers, sometimes termed thermoset, oxidized, or "pre-ox" fibers, that have sufficient strength and flexibility to permit the creation of tows that can be handled and woven into 2-dimensional cloth or a 3-dimensional structure. They can also be employed as parallel fiber lay-ups, with the fibers being joined by a suitable carbonaceous binder at crossing points, as well as in the form of woven cloth. Use of these polymeric carbon-precursor fibers constitutes the preferred way of producing a carbon-carbon fiber or silicon carbide-carbon fiber composite material using the electrophoretic deposition process. These thermoset fibers, which are sometimes referred to as pre-ox fibers because exposure to oxygen at elevated temperature creates some crosslinking stabilization have the desirable electrical insulating properties. They can be made from various raw materials, such as polyacrylonitrile (PAN), in which case the precursor fibers produce a yield of carbon fibers of about 50 weight percent; alternatively, if made from pitch, the shrinkage is less and the carbon fiber yield is up to about 75 percent. Such PAN precursor fibers have sufficient flexibility to permit weaving into 2-dimensional or 3-dimensional arrays, and although some shrinkage occurs during the carbonization step, it is acceptable. Carbonization is thereafter effected by heating at a temperature of about 1000° C. in the absence of oxygen, and this is advantageously preferably carried out as an intermediate step in a heating cycle on the way to ultimate consolidation by CVI and/or hot-pressing.

The liquid medium which is used to create the slurry is preferably a nonaqueous liquid, and usually a suitable organic liquid is employed. Examples of suitable liquid mediums include lower alkyl ketones ($C_2$ through $C_8$), lower alkanols ($C_1$ through $C_8$), nitromethane, $C_6$ to $C_{10}$ alkanes, aromatic hydrocarbons having a single benzene ring, acetonitrile, ethylacetate, and ethylene or propylene carbonate. Commonly available and relatively inexpensive organic liquids, such as acetone, are preferred.

As earlier mentioned, electrophoresis is a process by which charged particles are forced to migrate through a generally liquid medium by applying an electrical field across the medium between two electrodes. As a result, cations in the liquid medium will migrate towards the cathode, and anions will migrate toward the anode. In the present invention, charged particles are forced to migrate through the holes or interstices within a fibrous array in order to reach the target electrode surface. Particles continue to deposit upon first layers of particles in contact with or close to the electrode, and a growth front of particulate material is created which moves from the target electrode surface outward until the fibrous array is entirely impregnated with the electrodeposited particulate material. For this electrophoretic process to proceed, the particles in the slurry must be electrically charged, and if the particles are not electrically conducting, it may be necessary to increase the voltage to obtain thicker deposits as would be realized by one of ordinary skill in this art. A thickness of an inch or more is considered feasible.

Carbon particles, for example, as a result of their nature and methods of manufacture generally contain residual functional groups at their surfaces, e.g. carboxylic acids and alcohols, which can be negatively charged by the addition of an appropriate base, and will thus migrate to the anode. Particles of silicon carbide or other ceramics and metal particles require a pretreatment before a surface charge can be applied thereto so that electrophoretic deposition will proceed. They are generally suitably negatively charged, and the target electrode is connected as the anode so that such negatively charged particles will migrate theretoward. Alternatively, if the particles in the slurry were positively charged, the target electrode would be connected as the cathode. As an alternative to the use of carbon particles constituting substantially 100 percent carbon, oligomers which are not fully pyrolyzed, and which are sometimes referred to as mesophase carbon particles, can alternatively be employed. Pyrolysis of these particles is then effected as an initial portion of the consolidation step, and similar conditions can be used as those which are employed to carbonize the pre-ox carbon precursor fibers.

Silicon carbide particles may have organic acid or amine groups grafted to their surfaces or otherwise connected thereto. Generally these particles are coated with a surfactant, such as stearic acid, to provide a multitude of —COOH groups. The surfactant-coated particles are then charged using a charging agent, for example, a suitable base, such as butylamine. Similar arrangements can be used to charge metal or ceramic oxide particles, and other surfactants which may be employed include oleic acid and cellulose acetate hydrogen phthalate (CAP). Similarly, other basic charging agents known in the art can be used, for example, some other lower alkyl amine or a suitable base such as ammonium hydroxide.

When charged carbon particles are used, it is sometimes advantageous to use a dispersing agent which not only serves to improve the electrophoretic deposition of such particles but adds some green strength to the particle-impregnated fibrous array. The use of a dispersing agent to promote dispersion of carbon particles suspended in the liquid medium is preferred. For example, a dispersing agent in an amount of up to about 7 weight percent, based upon the weight of the carbon particles in the slurry, might be used, e.g. ethylcellulose or some equivalent material such as CAP which also serves this function. A dispersing agent, such as CAP, which contains ionizable functional groups, may be employed with silicon carbide or silicon nitride particles.

The size of the particles employed in the liquid medium slurry is important, and the selection of the particle size is also in some part dependent upon the diameters of the microfilaments that are employed in the tows and the spacings therebetween. The particles must be of a size so they can be suspended in the liquid medium, either with or without the use of ultrasonification, and generally the particles have a size range between about 0.05 micron and about 10 microns, although preferably particles about 2 microns or less are used and most preferably the particles are of a size not greater than about 1 micron. For certain composite constructions, it is considered advantageous that the particles are of a size less than the spacing between adjacent microfilaments or fibers in the individual tows so as to at least partially fill the interstices of the tows and obtain higher density in an ultimate composite product that is consolidated by hot-pressing or the like. On the other hand, should it be felt to be advantageous either to retain the interstices between adjacent fibers in the tows or to fill them substantially completely with CVI material, one might employ a slurry of larger particles having a size greater than the spacing between fibers. In such a situation, the primary densification would occur in the regions surrounding the individual tows, and the overall porosity of the composite would be higher than for a composite wherein CVI was thereafter used to fill the interstices in the tows.

As earlier indicated, the fibers and the particles are chosen to create a composite product of desired composition. A mixed matrix can be created by electrophoretically co-depositing mixtures of oxides or other ceramics. Co-deposition of mixtures of various metals, such as aluminum and titanium, or of metals and metalloids, such as silicon and beryllium, can also be used, and they can be subsequently treated, following consolidation if desired, so as to convert them from an elemental to a compound state. For example, silicon particles can be converted to silicon nitride by exposure to a nitrogen atmosphere at a nitriding temperature, i.e. about 1300° C. or above, or particles of aluminum and titanium can be subjected to an oxidizing atmosphere to create a mixed alumina/titania ceramic matrix. By co-depositing other particles with SiC particles, for example, thermal conductivity or other physical or mechanical properties, such as oxidation resistance, electrical conductivity, overall density and coefficient of expansion, can be particularly tailored to meet a desired specification; for instance, one might employ a mixture of SiC and hafnium boride.

After the growth front of electrodeposited particulate material reaches the front surface of the fiber array or preform, the impregnation is considered complete, and the electrical power is removed to halt further electrophoretic deposition. As mentioned previously, it may be desirable to increase the voltage in the later stages of deposition of fairly thick deposits. The electrode and its juxtaposed fibrous array or arrays are removed from the particle-containing slurry, and the impregnated array is split off from the surface of the electrode. A simple drying operation is then effected so as to remove any residual liquid from the fibrous array. Optionally, a layer of thin foil can be laminated to the surface of the electrode, and the fiber array placed in juxtaposition with the surface of the thin foil to facilitate separation. However, the impregnated fiber array can usually be readily split off from most metal electrode surfaces without the need for such a foil backing.

The electrophoretic deposition process provides fairly dense matrix material in the form of these small particles disposed in surrounding relationship to the continuous fibers in the fibrous array or preform that is employed, and following the impregnation step, the porosity of the intermediate fibrous array should be no greater than about 45% and preferably about 35% or less. By porosity is meant the amount of void volume relative to the total volume of the intermediate array.

Following particle impregnation and drying, an appropriate consolidation step is effected which involves heating. It can be carried out by using an appropriate vaporous material, which should be compatible with the impregnated particles, to lock or cross-link them in positions adjacent the fibers, or by simply employing heat to change the particulate character of the particles, such as by hot-pressing to cause individual particles to sinter together. For example, chemical vapor infiltration (CVI) at elevated temperatures is often used, either alone or subsequent to hot-pressing or the like, and CVI employs an appropriate vaporous substance either to deposit the same chemical substance which constitutes the particles that were impregnated or to deposit some other desired compatible substance.

Hot-pressing is generally carried out at a temperature between about 300° C. and about 3000° C. Although unidirectional hot-pressing can be employed, isostatic hot-pressing is preferably used, with an isostatic pressure of between about 200 and about 20,000 psi being applied to the impregnated array. With respect to hot-pressing certain particles, consolidation may be aided by the inclusion of small amounts of a sintering aid. For example, when silicon carbide particles are being employed for the matrix material, it may be advantageous to include in the slurry submicron-sized particles of boron or yttria (in an amount equal to about one to about ten weight percent of SiC) to serve as a sintering aid. When silicon nitride particles are used, particles of yttria, another rare earth metal oxide or magnesium oxide may be used as a sintering aid.

Depending upon the particular particles that have been impregnated, a hot-pressing step is sometimes employed as a preliminary step to a reaction-sintering step to be carried out with a suitable sintering atmosphere. Reaction sintering may be used to provide a metal oxide matrix after preliminary hot-pressing of impregnated metal particles, and such reaction sintering may take place at a temperature between about 500° C. and about 3000° C. over a time period of from about ½ hour to about 24 hours. As another example, a composite material might be made using an array of carbon fibers coated with exterior coatings of silicon carbide so as to render them electrically insulating. The particles being impregnated might be micron-sized particles of silicon, which particles, following drying to remove any residual organic liquid, could be initially consolidated by hot-pressing at a temperature of about 1600° C. for about 2 hours. Thereafter, the hot-pressed elemental silicon could be converted to silicon nitride ($Si_3N_4$) by subjection to a nitrogen atmosphere at a temperature of about 1400° C. for about 20 hours.

When a vaporous substance is used in the consolidation step, preferably CVI is employed, either exclusive of hot-pressing or subsequent thereto. In CVI, the impregnated array is infiltrated with additional matrix material compatible with the aggregated particles to link them together and further densify the composite. CVI can and sometimes is used to infiltrate carbon into a fiber array that has been impregnated with submicron-sized particles of carbon, which is one example of using the same material as that from which the particles are formed. However, when carbon particles are used, often a mixture with about 1 to about 10 weight % of silicon particles is used instead of all carbon particles. CVI can also be used to produce a mixed matrix composite material by employing a vaporous material that deposits a chemical substance different than the impregnated particles. For example, continuous fibers of mullite or silicon carbide might be impregnated with particles of alumina using a slurry of submicron-sized alumina particles; following drying, consolidation might be by CVI to deposit silicon carbide and thus produce a mixed ceramic $SiC/Al_2O_3$ matrix composite. CVI can be used to deposit a wide variety of matrix materials.

When the reinforcing fibers being used are formed of a precursor material, such as a carbonaceous precursor of carbon fibers, the heating cycle which is employed as part of the hot-pressing step or of the heat-up preliminary to CVI is advantageously regulated so as to first appropriately complete the carbonization of these precursor fibers and turn them into strong carbon fibers during an initial portion of the consolidation step and to then continue the heating to effect consolidation without significantly lowering the temperature. For example, the heat-up preliminary to hot-pressing may be made more gradual so that carbonization takes place slowly while the temperature is being raised to about 1000° C. over a period of about 3 hours, preliminary to either hot-pressing or to subjecting the impregnated fiber matrix to CVI. Optionally, when carbon matrix particles are used, the carbon particle-impregnated array can be further impregnated or coated with a carbonaceous resin material which will coat the individual carbon particles and then itself become pyrolyzed during the subsequent heating step, thereby adding more carbon to the matrix material and further reducing the porosity. Commonly, carbon fibers or microfilaments of about 5 microns in diameter are available in tows which may include about 3000 fibers per tow. If instead of carbon fibers, precursor fibers are used which are not yet completely carbonized, so as to provide the desired electrical insulating properties, these precursor microfilaments generally have diameters of about 10 to about 20 microns and are available in tows of about 1000 microfilaments. When working with carbon fiber tows in about the foregoing size range, carbon particles might be used having a maximum size of about 95 nanometers (0.095 micron).

Depending upon the size of the particles that are employed in the slurry and the distances separating the fibers in the tow, relatively highly dense composite materials can be obtained when desired. Generally, the porosity of the particle-impregnated fiber array is no greater than about 45 percent following the electrophoretic deposition step, and preferably it is no greater than about 35 percent. Thereafter, when a heating step alone is used, for example, isostatic hot-pressing, the porosity of the resultant composite is in the range of about 20 to 10 percent. When CVI is used, even greater densities are obtainable, and commonly the porosity of a composite material made in this manner wherein consolidation is via CVI will be between about 20 percent and about 1 or 2 percent.

Very generally, for carbon fiber carbon matrix composites, the electrophoretically impregnated intermediate fibrous array can be consolidated either by CVI or by the application of a resinous material followed by carbonization of the resin, or by a combination of both wherein the CVI is used as the second step. For silicon carbide matrix/silicon carbide fiber composites, the appropriate intermediate can be consolidated either by CVI or by hot-pressing using a sintering aid such as boron or yttria. For silicon nitride matrix/silicon carbide fiber composites, consolidation can be via CVI or via hot-pressing with a yttria sintering aid. Thus it can be seen that, in all of these various procedures, the electrophoretic impregnation is extremely useful as a pre-loading step to incorporate particulate matrix material throughout the interstices of a fiber array with the ultimate porosity reduction coming as a part of the CVI consolidation step.

The fiber arrays or fiber preforms can be fashioned in various suitable ways and can have varying thicknesses depending upon the ultimate products desired. For example, suitable preforms may constitute from 10 to 100 layers of woven carbon fiber cloth, and frequently a lay-up of about 20 layers of cloth is employed for commercial applications. When consolidation of such a structure is intended to be carried out ultimately by CVI, greater strength may be achieved by employing carbon particles in the size range of about 1 to 5 microns so that the interstices between the adjacent fibers within the tow are substantially filled via CVI, which occurs subsequently to substantially filling the void regions between the tows in the woven layers by the electrophoretically deposited particles.

The following examples set forth certain exemplary processes for producing composites having various features of the invention; however, they should be understood as being merely illustrative and not limiting upon the scope of the invention which is defined by the claims at the end of this specification.

EXAMPLE I

Woven silicon carbide fiber cloth such as that sold under the trademark "Nicalon" is desized as needed and cut to desired size. Desizing is effected by heating in a furnace at a low temperature in order to burn off sizing material. The individual cut fabric sections are stacked and pressed together to form a fibrous lay-up or preform. The lay-up is then arranged in juxtaposition against the flat surface of a metal electrode, and the electrode is positioned in a beaker that will hold an electrophoretic bath containing a desired slurry. A second flat electrode is spaced a suitable distance from the surface of the first electrode so that the fiber lay-up is positioned between the two flat electrodes.

The slurry which serves as the electrophoretic bath includes a suspension of silicon nitride particles. About 35 grams of silicon nitride and yttria particles are dispersed in about 200 milliliters of acetone containing about 0.5 gram of stearic acid. Yttria particles are present in an amount equal to about 6 weight percent of the amount of silicon nitride. The yttria particles have a size range between about 0.1 micron and about 10 microns, and the silicon nitride particles have a size range between about 0.1 micron and about 3 microns, thus having the general size of a powder. The slurry is subjected to ultrasound for about 60 seconds, centrifuged and decanted; the powder is then washed twice with fresh acetone to remove excess stearic acid. The powder is then transferred to a beaker containing about 400 milliliters of acetone and an amount of n-butylamine equal to about 0.5 weight percent of the powder, in which beaker the electrodes are disposed. The slurry is again subjected to ultrasound for 60 seconds prior to the initiation of electrophoretic deposition, and optionally ultrasound treatment is carried out during electrophoresis. A voltage of about 320 volts is applied across the electrodes. After about 10 to 15 minutes, infiltration is complete; voltage is removed; and the fiber array is removed from the electrodeposition bath and separated from the electrode. It is then subjected to isostatic hot-pressing for about 1 hour at 1700° C. and about 4–5 kilograms per square inch (KSI). The density of the composite material is excellent, and the Vickers hardness of the silicon nitride matrix material is in the range of about 1350 kilograms per square millimeter.

EXAMPLE II

The general procedure of Example I is repeated except for using a slurry that includes 70 weight percent carbon particles and 30 weight percent silicon particles. The carbon particles have a size range between about 0.5 micron and about 5 microns, and the silicon particles have a size range between about 1 micron and about 8 microns. Hot-pressing is then carried out at about 1600° C. for 30 minutes at an isostatic pressure of 6 KSI. The silicon melts, and reaction sintering occurs forming some silicon carbide. The resultant composite is very dense, has matrix material of fine grain size and has excellent structural strength.

EXAMPLE III

The general procedure of Example I is repeated using carbon precursor fiber cloth made from electrically insulating, "pre-ox" carbonaceous material which, following pyrolysis, produces substantially pure carbon in about a 75 percent yield. The slurry which is used contains about 30 grams of carbon particles, 7 weight percent ethylcellulose (based upon weight of carbon) and n-butylamine in an amount equal to about 0.45 weight percent of the carbon, in 400 milliliters of acetone. The slurry is ultrasonicated, and a voltage of about 320 volts is applied for about 15 minutes, after which time electrical power is removed. The particle-impregnated fiber lay-up is removed, dried, and then heated to a temperature of about 1000° C. over a period of about 3 hours in the absence of oxygen and held at this temperature for about 3 hours, causing the pre-ox fibers to carbonize. Examination of the resultant particle-impregnated array shows that the porosity has been reduced to about 38 percent. The particle-impregnated array is then subjected to CVI using $CH_4$ at about 900° C. for about 400 hours which slowly deposits carbon throughout the interstices of the matrix and reduces the porosity of the carbon/carbon fiber composite to about 7 percent. The strength and other properties of the composite are comparable to those of composites that are made by subjecting woven carbon fiber lay-ups to CVI for about 600 hours, illustrating a very substantial reduction in fabrication costs by using the electrophoretic impregnation process.

EXAMPLE IV

The process of Example III is repeated, however, following removal from the electrodeposition bath and drying, a phenolic resin of suitable viscosity is used neat to infiltrate the particle-impregnated fibrous array. Curing is then carried out at about 160° C. for 5 hours. Thereafter, carbonization of the phenolic resin and the pre-ox fibers is carried out at about 800° C. in a nitrogen atmosphere for 48 hours, followed by about 3 hours at 1000° C. The resultant material is then subjected to CVI as in Example III, and treatment for only about 300 hours results in comparable densification because of the carbon contributed by the phenolic resin.

EXAMPLE V

The procedure of Example IV is repeated except that, instead of using the phenolic resin neat, it is loaded with about 30 weight percent of carbon particles equal or less than about 270 nanometers in size. The resultant intermediate product after carbonization is of still slightly higher density, and treatment with CVI for about 200 hours gives a composite material having comparable strength and toughness to that which results from the procedure of Example III.

EXAMPLE VI

Woven alumina fiber cloth, such as that sold under the trademark "Nextel-610" by 3M or that sold as FP by Du Pont, is desized as needed and cut to desired size. Eight individual cut fabric sections are stacked and pressed together to form a fibrous lay-up which is then positioned in juxtaposition against the flat surface of a metal electrode. This electrode is employed in an electrophoretic bath containing a desired slurry, and a second flat electrode is spaced a distance from the surface of the first electrode of about 2 centimeters so that the fiber lay-up is positioned between the two flat electrodes.

To form the slurry, a suspension of beryllium (Be) particles is formed by dispersing about 40 grams of Be particles in about 400 milliliters of acetone containing about 2 grams of CAP and about 0.2 gram of n-butylamine (i.e. equal to about 0.5 weight percent of the Be particles). The Be particles are between about 1 micron and about 10 microns in size. This slurry is subjected to ultrasound for 60 seconds prior to the initiation of electrophoretic deposition, and optionally ultrasound treatment is carried out during electrophoresis. A voltage of about 320 volts is applied across the electrodes, and after about 20 minutes, infiltration is complete. Voltage is removed, and the fiber array is removed from the electrodeposition bath and separated from the electrode. It is then subjected to isostatic hot-pressing for about 4 hours at 1050° C. and about 300 kilograms per square inch (KSI). The porosity of the composite material is only about 15%. The resultant composite has a Be matrix of fine grain size and has good structural strength and rigidity.

Although the invention has been described with regard to a number of preferred embodiments which constitute the best mode presently known to the inventors for carrying out their invention, it should be understood that various changes and modifications as would be obvious to one having ordinary skill in this art may be made without departing from the scope of the invention which is defined by the appended claims. Particular features of the invention are emphasized in the claims which follow.

What is claimed is:

1. A method of making a fiber-reinforced carbon, ceramic or metal matrix composite material, which method comprises the following steps:

providing an array of reinforcing fibers which array has electrically insulating characteristics, said fibers of array having interstices, disposing said array in a liquid slurry in juxtaposition to a surface of a first electrode, said slurry including a liquid medium and a mass of particles of a size so as to be suspended within said liquid medium, said particles having an electrical charge, providing a second electrode in contact with said slurry and spaced from said first electrode, impregnating said fiber array with particles by creating an electric field in said slurry by applying voltage to said electrodes so that said particles migrate through said fiber array toward said surface of said first electrode where said migrating particles aggregate against said first electrode surface and gradually fill the interstices of said fiber array, removing said particle-impregnated array from said slurry, and drying said impregnated array and consolidating said impregnated array by subjecting same to heat under conditions which consolidate said aggregated particles and thereby form a dense fiber-reinforced composite material.

2. A method according to claim 1 wherein said particles are formed of electrically conductive material, said slurry includes organic additive material which electrically charges a surface of said particles, and said fibers are made of electrical insulating material.

3. A method according to claim 1 wherein said particles are made of electrically nonconducting material and wherein said slurry includes organic additive material which electrically charges a surface of said particles.

4. A method according to claim 1 wherein said fiber array includes a plurality of layers of 2-dimensional woven fabric formed of tows of individual fibers of substantial length having spacings between adjacent fibers in said tows.

5. A method according to claim 4 wherein said size of said particles is substantially smaller than the spacings between adjacent fibers in said tows in said woven fabric, and wherein said consolidation step is carried out by hot-pressing at a temperature between 300° C. and about 3000° C. while an isostatic pressure of between about 200 and about 20,000 psia is applied to said impregnated array.

6. A method according to claim 4 wherein said particles are particles of a mixture of elemental metals and wherein, following said hot-pressing, said particle-impregnated array is further reaction-sintered at a temperature of between about 500° C. and about 3000° C. for about 0.5 hour to about 24 hours to cause alloying of said elemental metals.

7. A method according to claim 1 wherein said particles are particles of ceramic material said size of which being between about 0.1 micron and about 10 microns.

8. A method according to claim 1 wherein said liquid medium is a nonaqueous liquid and wherein said surface of said first electrode is flat and said fiber array is disposed in contact with said surface.

9. A method according to claim 1 wherein said particles are metal particles and wherein, following said drying, said fiber-impregnated array is further subjected to high temperature in a nitriding or oxidizing atmosphere so as to convert said metal particles to particles of metal nitride or oxide.

10. A method according to claim 1 wherein said fibers are carbon fibers coated with an exterior coating of silicon carbide, wherein said particles are particles of silicon and wherein, following said drying, said silicon particles are consolidated by hot-pressing and thereafter further converted to silicon nitride by exposure of said impregnated, consolidated array to a nitrogen atmosphere at a temperature of at least about 1300° C.

11. A method according to claim 1 wherein said particles comprise: (a) a mixture of from about 90% to about 99% by weight carbon particles and from about 1% to about 10% by weight silicon particles, or (b) a mixture of particles of silicon nitride and particles of an oxide of yttrium or another rare earth metal, or (c) a mixture of particles of silicon nitride and particles of magnesium oxide.

12. A method according to claim 1 wherein said consolidation step is carried out by infiltrating said impregnated array with additional material chemically compatible with said aggregated particles using chemical vapor infiltration.

13. A method according to claim 1 wherein said reinforcing fibers are formed of carbonaceous precursor material which is electrically insulating and wherein said precursor materials are pyrolyzed to create strong reinforcing fibers following said particle impregnation step.

14. A method according to claim 13 wherein said slurry includes an organic additive which promotes dispersion of said suspended particles in said medium and wherein, subsequent to said drying, said particle-impregnated array is further impregnated with a carbonaceous resin material which coats said particles and which is pyrolyzed during said heating step.

15. A method according to claim 1 wherein said particle-impregnated fiber array has a porosity no greater than about 45% prior to said consolidation step and wherein said dense fiber-reinforced structure following said heating step has a porosity no greater than about 20%.

16. A method according to claim 1 wherein said fibers are made of silicon carbide, wherein said particles are particles of titanium aluminide, and wherein said heating step is carried out by hot-pressing at a temperature of between about 1000° C. and 1700° C. and a pressure of between about 200 and about 20,000 psia.

17. A method of making a fiber-reinforced carbon, ceramic or metal matrix composite material, which method comprises the steps of:

providing an array of reinforcing fibers which are formed of organic precursor material having electrically insulating characteristics, said fibers of array having interstices, disposing said array in a nonaqueous slurry in juxtaposition to a surface of a first electrode, said slurry including a nonaqueous liquid medium and a mass of particles of a size so as to be suspended within said liquid medium, said particles having an electrical charge, providing a second electrode in contact with said slurry and spaced from said first electrode, impregnating said fiber array with particles by creating an electric field in said slurry by applying voltage to said electrodes so that said charged particles migrate through said fiber array toward said surface of said first electrode where said migrating particles aggregate and fill the interstices of said fiber array, removing said particle-impregnated array from said slurry, and drying and heating said impregnated array to consolidate said aggregated particles and pyrolyze said precursors to form carbon fibers having electrically conductive properties and thereby create a solid dense fiber-reinforced composite material.

18. A method according to claim 17 wherein, subsequent to said pyrolysis of said precursors, said array is further subjected to chemical vapor impregnation to further consolidate said particles without lowering said array significantly below a temperature at which said pyrolyzing takes place.

19. A method of making a fiber-reinforced carbon, ceramic or metal matrix composite material, which method comprises the following steps:

providing an array of reinforcing tows of individual fibers of a diameter not greater than about 10 µm which fibers have electrically insulating characteristics, said fibers of array having interstices, disposing said array in a liquid slurry in juxtaposition to a surface of a first electrode, said slurry including a liquid medium and a mass of particles of a size so as to be suspended within said liquid medium, said particles in said slurry being electrically charged, providing a second electrode in contact with said slurry and spaced from said first electrode, impregnating said fiber array with particles by creating an electric field in said slurry by applying voltage to said electrodes so that said charged particles migrate through said fiber array toward said surface of said first electrode where said migrating particles aggregate and fill the interstices of said fiber array between said tows, removing said particle-impregnated array from said slurry, drying said impregnated array, and subjecting said dried, impregnated array to chemical vapor infiltration (CVI) which consolidates said aggregated particles and thereby forms a solid dense fiber-reinforced composite material.

20. A method according to claim 19 wherein said particles have an average size which is greater than the spacing between adjacent fibers in said tows so that the interstices between said fibers in said tows are subsequently filled during CVI.

\* \* \* \* \*